United States Patent
Burckhardt et al.

[11] 3,727,902
[45] Apr. 17, 1973

[54] COIL COMPRESSION SPRING

[75] Inventors: Manfred H. Burckhardt, Waiblingen; Hans-Herbert Wupper, Oberhaunstadt/uber Ingolstadt (Donau); Siegfried Worbis, Jesingen/uber Plochingen, all of Germany

[73] Assignee: Daimler-Benz Aktiengesellschaft, Stuttgart-Untertwerk-heim, Germany

[22] Filed: Apr. 27, 1971

[21] Appl. No.: 137,834

[30] Foreign Application Priority Data

Apr. 28, 1970 Germany............P 20 20 678.4

[52] U.S. Cl..................................267/180, 267/61
[51] Int. Cl. ...................................F16f 1/08
[58] Field of Search...............267/180, 166, 168, 267/60, 61

[56] References Cited

UNITED STATES PATENTS

| 1,963,054 | 6/1934 | Powers | 267/61 R |
| 2,267,153 | 12/1941 | Holland | 267/61 R |

FOREIGN PATENTS OR APPLICATIONS

| 1,460,793 | 10/1966 | France | 267/180 |

Primary Examiner—James B. Marbert
Attorney—Craig, Antonelli & Hill

[57] ABSTRACT

A coil spring with progressive characteristics, especially for the installation in brake valves of motor vehicles, in which the progressivity of the characteristics are realized by ground surfaces in the form of a truncated cone on one or both sides of a cylindrical coil spring made in the customary manner.

21 Claims, 3 Drawing Figures

PATENTED APR 17 1973 3,727,902

INVENTORS
MANFRED H. BURCKHARDT
HANS-HERBERT WUPPER
SIEGFRIED WORBIS

BY Craig, Antonelli, Stewart & Hill

ATTORNEYS

COIL COMPRESSION SPRING

The present invention relates to a coil compression spring with a progressive spring characteristics and to a method of making the same. In particular, the present invention relates to a spring for the installation in brake valves of servo-brake installations in motor vehicles.

Spring constructions with progressive characteristics curves are known for quite some time. One possibility for the manufacture of a progressively acting spring resides in manufacturing the spring with a differently large pitch of the individual windings from wires with a constant diameter. In the course of an inward spring deflection, coils are continuously brought into abutment whereby the spring rate is increased. Since the wire diameter is determined by the permissive stress at maximum spring load, coils are cut off in effect at these prior art springs at very low stresses. The spring steel is not utilized optimum and the required structural space as well as the required space for the installation become quite large. Additionally, the manufacture is quite complicated.

The aforementioned reasons have led to the manufacture of springs with progressive characteristics by changing the wire diameter. Various methods have been developed in the prior art, with the aid of which it is possible to manufacture these wires economically at least to some extent. From the manufacturing point of view, it thereby plays no important role what thickness variation such wires possess. However, it is quite difficult to produce a predetermined characteristic without substantial development work.

The present invention is concerned with the task to provide a spring with progressive characteristics whose manufacture is possible in a simple and easy manner and which therebeyond offers functional advantages. The underlying problems are solved according to the present invention in that the progressivity of the characteristics is realized by cutting or grinding the surfaces on one or both sides of a cylindrical coil spring, manufactured in a customary manner, into the form of a truncated cone.

It is achieved by the present invention that no displacement of the surface center of gravity occurs so that the spring—contrary to known constructions—does not seek to carry out any deviation movement during the spring deflection. The largest spring rate of the ground spring is equal to the spring rate of the initial spring. The smallest spring rate is dependent on the remaining wire cross section. It is furthermore advantageous that the characteristics of the spring can be readily matched to the given requirements by a change of the cone angle during the grinding operation. Hence, with one and the same initial spring, one can cover a relatively wide range. Any changes of the characteristics, which become necessary subsequently, can be realized without difficulty.

Accordingly, it is an object of the present invention to provide a compression coil spring and method of manufacturing the same which avoid the aforementioned shortcomings and drawbacks by simple means.

Another object of the present invention resides in a coil spring with predetermined progressive characteristics which can be readily manufactured without substantial development work and can be readily adapted to prevailing requirements.

A further object of the present invention resides in a coil spring of the type described above which permits optimum use of the spring steel.

Still a further object of the present invention resides in a method for economically manufacturing coil springs with progressive spring characteristics.

These and other objects, features and advantages of the present invention will become more obvious from the following description when taken in connection with the accompanying drawing, which shows, for purposes of illustration only, one embodiment in accordance with the present invention, and wherein.

Figure 1:
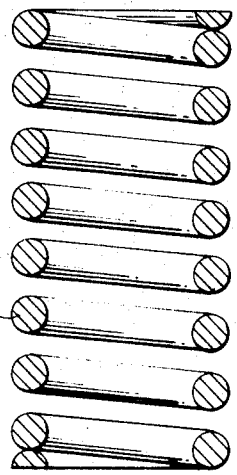
FIG. 1 is a longitudinal cross-sectional view through a conventional coil compression spring with constant wire diameter.
Figure 3:
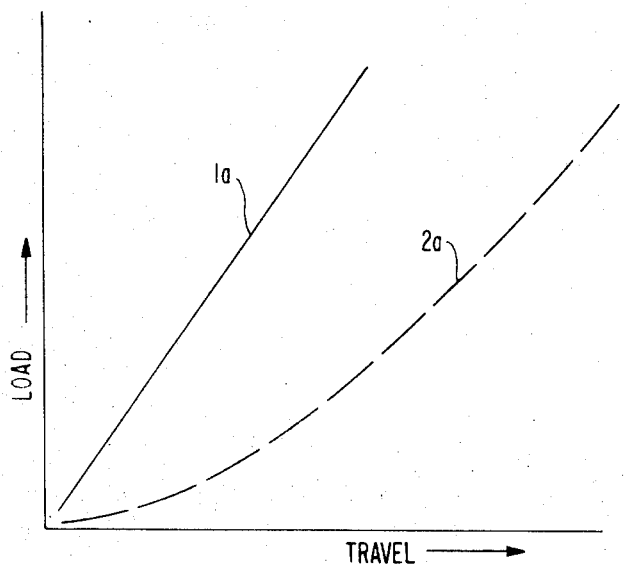
FIG. 3 is a diagram representing the spring characteristics of the springs according to FIGS. 1 and 2.

Referring now to the drawing, and more particularly to FIG. 1, the coil compression spring 1 with constant coil diameter possesses a constant wire diameter so that the spring characteristic curve 1a, visible in FIG. 3, results from this spring.

Figure 2:
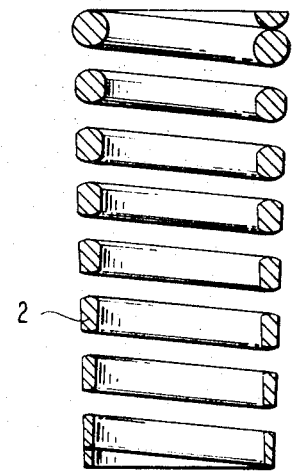
FIG. 2 is a longitudinal cross-sectional view of the spring according to FIG. 1 with ground surfaces of conically truncated shape on both sides thereof in accordance with the present invention.

In order to obtain from the spring 1 according to FIG. 1, a spring 2 according to FIG. 2 which has a progressive characteristic 2a according to FIG. 3, the spring 2 is provided on both sides, i.e., internally and externally, with ground surfaces in the shape of a truncated cone. The extent of the cone angle may be changed depending on the desired progressivity. In lieu of ground surfaces on both sides, of course, a ground surface on only one side may also be provided. Furthermore, it is of course also possible to grind only a portion of the spring, in relation to the length thereof, into a conical shape.

While we have shown and described only one embodiment in accordance with the present invention, it is obvious that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A compression coil spring with progressive spring characteristics, characterized in that the progressivity of the characteristics is realized by ground surfaces in the form of a substantially truncated cone in an otherwise cylindrical coil spring, wherein the axis of said truncated cone extends in the same direction as the cylindrical coil spring longitudinal axis.

2. A coil spring according to claim 1, characterized in that the ground surfaces are provided on at least one of the two surfaces consisting of internal and external surfaces of the coils of the springs, said internal surfaces facing generally in the direction of the spring longitudinal axis and said external surfaces facing away from the spring longitudinal axis.

3. A coil spring according to claim 2, characterized in that the ground surfaces of truncated conical shape are provided on both sides of the spring.

4. A coil spring according to claim 3, characterized in that the ground surfaces extend only over a portion of the spring in relation to its length.

5. A coil spring according to claim 3, characterized in that the ground surfaces extend substantially over the entire length of the spring.

6. A coil spring according to claim 1, characterized in that the ground surfaces extend only over a portion of the spring in relation to its length.

7. A coil spring according to claim 1, characterized in that the ground surfaces extend substantially over the entire length of the spring.

8. A method for manufacturing a coil compression spring with progressive characteristics comprising the steps of: producing a cylindrical coil spring having a substantially constant pitch from a wire of substantially constant diameter, said cylindrical coil spring having a longitudinally extending spring axis, and forming at least one of the two surfaces consisting of internal and external surfaces of the coil spring substantially in the shape of a truncated cone having a cone axis extending in the same direction as the spring axis.

9. A method according to claim 21, characterized in that both the internal and external surfaces are ground in the shape of a truncated cone.

10. A method according to claim 9, characterized in that said surfaces are ground in the shape of a truncated cone at least over a part of the length of the spring.

11. A method according to claim 9, characterized in that said surfaces are ground in a substantially truncated conical shape substantially over the entire length of the spring.

12. A method according to claim 9, characterized in that said surfaces are ground in the shape of a truncated cone at least over a part of the length of the spring.

13. A method according to claim 9, characterized in that said surfaces are ground in a substantially truncated conical shape substantially over the entire length of the spring.

14. A method according to claim 9, characterized in that only one of said two surfaces are ground into the shape of a truncated cone.

15. A resilient coil spring comprising a continuous member having a plurality of helical windings extending about a centrally disposed longitudinal spring axis for at least a portion of the length of said member, said windings having varying cross-section along at least a portion of said member for providing progressive spring characteristics to said spring, said windings exhibiting internal surface portions facing generally inwardly toward the spring axis and external surface portions facing generally outwardly away from the spring axis, wherein said windings exhibit a maximum cross-section at one position along the length of the longitudinal axis where the internal surface portion is spaced a minimum distance from said spring axis and the external surface portion is spaced a maximum distance from said spring axis, wherein the internal surface portions of all of said windings are spaced from said longitudinal axis at least a distance corresponding to said minimum distance and the external surface portions of all of said windings are spaced from said longitudinal axis at most a distance corresponding to said maximum distance, and wherein the cross-section of said windings is varied by constructing at least one of said internal and external surface portions in the shape of a longitudinally extending truncated cone along at least a portion of the length of the spring.

16. A coil spring according to claim 15, wherein the axis of said truncated cone coincides with said spring axis.

17. A coil spring according to claim 16, wherein said internal surface portions are constructed in the shape of a truncated cone.

18. A coil spring according to claim 16, wherein said external surface portions are constructed in the shape of a truncated cone.

19. A coil spring according to claim 16, wherein both said internal surface portions and said external surface portions are constructed in the shape of a truncated cone.

20. A coil spring according to claim 15, wherein said coil spring is constructed by grinding the truncated cone shaped surfaces in an otherwise cylindrical coil spring formed with the continuous member of constant cross-section.

21. A method according to claim 8, wherein the step of forming includes grinding said surfaces.

* * * * *